United States Patent [19]
Nakajima et al.

[11] Patent Number: 5,387,160
[45] Date of Patent: Feb. 7, 1995

[54] HEAT RESISTANT RUBBER COMPOSITIONS AND BELTS MADE THEREFROM

[75] Inventors: Masayoshi Nakajima; Kazutoshi Isida; Kazuhiro Takeda, all of Kobe, Japan

[73] Assignee: Mitsuboshi Belting Ltd., Nagata, Japan

[21] Appl. No.: 15,370

[22] Filed: Feb. 9, 1993

[30] Foreign Application Priority Data

Feb. 10, 1992 [JP] Japan ............ 4-057399
May 12, 1992 [JP] Japan ............ 4-146294

[51] Int. Cl.⁶ ........................................ F16G 13/02
[52] U.S. Cl. ............................... 474/205; 474/260; 474/263; 474/271; 428/423.1; 428/522
[58] Field of Search ............ 474/205, 237, 260, 261, 474/263, 264, 271

[56] References Cited

U.S. PATENT DOCUMENTS

| | | |
|---|---|---|
| 4,721,496 | 1/1988 | Yokoyama et al. .......... 474/263 X |
| 5,051,299 | 9/1991 | Brown .............................. 428/221 |
| 5,053,450 | 10/1991 | Coran ............................. 524/506 |
| 5,187,232 | 2/1993 | Musch et al. .................. 525/215 |
| 5,212,982 | 5/1993 | Macchiarulo et al. .......... 73/159 |
| 5,230,668 | 7/1993 | Kawashima et al. ........... 474/263 |
| 5,250,010 | 10/1993 | Mishima et al. ................ 474/263 |

*Primary Examiner*—Roger J. Schoeppel
*Attorney, Agent, or Firm*—Wood, Phillips, VanSanten, Hoffman & Ertel

[57] ABSTRACT

A rubber composition includes hydrogenated acrylonitrile-butadiene rubber (HNBR), a copper dithiocarbamate salt compound and sulfur. The use of the copper dithiocarbamate salt compound results in the vulcanized rubber composition exhibiting improved heat resistance as compared to a rubber material that does not include the copper dithiocarbamate salt compound. Toothed belts and V-ribbed belts can be made using the rubber composition to produce belts exhibiting improved heat resistance.

12 Claims, 1 Drawing Sheet

HEAT RESISTANT RUBBER COMPOSITIONS AND BELTS MADE THEREFROM

FIELD OF THE INVENTION

This invention relates generally to rubber compositions and belts made from the compositions, the belts being suitable for power transmission in motors. More specifically, this invention relates to heat resistant rubber compositions and toothed and V-ribbed belts made therefrom.

BACKGROUND OF THE INVENTION

Belts are known for use in motors such as automobile engines for power transmission. The belts can be toothed belts to reduce belt slippage and increase efficiency. The belts can be V-ribbed belts used to drive a plurality of auxiliary automotive apparatuses, e.g., an alternator, air conditioner and the like.

A conventional toothed belt includes a toothed portion and a back portion. The portions can be made of a rubber material that includes chloroprene rubber. A core, load bearing wire can be embedded in the back portion to increase belt strength. The core wire can be glass fiber cords bonded to the back portion with a resorcinol-formalin latex (RFL) solution containing styrene-butadiene rubber (SBR)-vinylpyridine latex as the latex component. A sheath of toothed cloth having shrink-wrapped nylon warps extending in the longitudinal direction of the belt can be placed over the teeth to extend the life of the belt.

A conventional V-ribbed belt includes a layer of bonding rubber and a layer of compressed rubber having at least two rib members extending in the longitudinal direction of the belt. The V-fibbed belt is stretched in a serpentine manner around a plurality of pulleys mounted to the auxiliary apparatuses to cause simultaneous rotation by communicating to the pulleys the rotation of a pulley mounted on an automotive crank shaft. This stretching requires that the V-ribbed belt have a high degree of bending and heat resistance.

The working temperature in an automotive engine compartment to which the toothed or V-ribbed belt is exposed has become higher due to the engine compartment being compacted and front wheel drive becoming more popular. The conventional toothed belt often falls at these higher temperatures because of chloroprene rubber failure which results in loss of teeth due to cracks developed on the back rubber potion or due to the dedendums or because of being cut due to bending-induced deterioration of the core wire. The conventional V-fibbed belt also experiences failure due to cracking of the rubber and bending deterioration of the core wire.

In response to the desire to extend the life of the belt, rubber materials using heat resistant elastomers such as hydrogenated chloroprene, hydrogenated aerylonitrilebutadiene rubber (HNBR) (obtained by hydrogenating acrylonitrile-butadiene copolymers) and chlorosulfonated polyethylene (CSM) have been used in the rubber material. Heat resistant rubber material is disclosed, for example, in Japanese patent laid open 62-159827.

The increasing severity of the working environment in automobiles, coupled with the requirement for a longer belt life, demand that rubber materials have a far better heat resistance than conventional rubber material. Among the three heat resistant elastomers disclosed above, the HNBR is more widely used because of its desirable heat resistance and oil resistance. The HNBR is used mostly in the form of a sulfur vulcanized rubber when the belt must also exhibit good dynamic characteristics, e.g., dynamic fatigue strength and dynamic deformation. Sulfur, either alone or in combination with vulcanizing accelerators such as thiuram, thiazole, sulfenamide compounds, sulfurylamide components and the like, is used in a system to vulcanize the HNBR.

With this vulcanization system, the quantity of sulfur is known to greatly influence not only the heat resistance but also influence the HNBR's dynamic characteristics. A decrease in the quantity of sulfur results in an increase in heat resistance and a diminishing of desirable dynamic characteristics. An increase in the quantity of sulfur results in a decrease in the heat resistance and an improvement in desirable dynamic characteristics.

Optimizing the iodine value (number) of HNBR and the quantity of the sulfur to be compounded with the HNBR suffers from a natural limitation to the improvement of heat resistance, although the limitation slightly varies depending on the combination with the aging retardant.

A rubber composition and belts made from that rubber composition that overcome at least one of the above-discussed shortcomings are desirable. The present rubber composition and belts satisfy this desire.

SUMMARY OF THE INVENTION

The present invention comprehends a heat resistant rubber composition suitable for use in a belt, which rubber composition includes hydrogenated acrylonitrile-butadiene rubber (HNBR), a sulfur dithiocarbamate salt compound and sulfur. The use of the copper dithiocarbamate salt compound improves the heat resistance of vulcanized rubber produced from the rubber composition in spite of the presence of sulfur. Thus, the vulcanized rubber exhibits an improvement in dynamic characteristics that are attributed to the sulfur without the decrease in heat resistance that conventionally results from an increase in the amount of sulfur utilized.

Belts for use in motors can be made from the rubber composition. These belts exhibit improved heat resistance as compared to belts made from a rubber material that does not include the copper dithiocarbamate salt compound. Thus, these belts are well suited for environments wherein they are exposed to elevated temperatures such as those that occur in automobile engines.

The belt can be a toothed belt or a V-ribbed belt.

Numerous other advantages and features of the present invention will become readily apparent from the drawings, detailed description of the preferred embodiments and the appended claims.

DETAILED DESCRIPTION OF THE PREFERRED EMBODIMENTS

Figure 1:
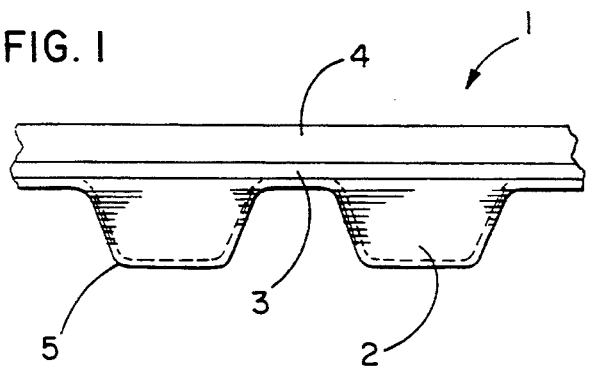
FIG. 1 is a side, sectional view of a toothed belt.

Although this invention is susceptible to embodiment in many different forms, there are shown in the drawings and will be described in detail, presently preferred embodiments of the invention. It should be understood, however, that the present disclosure is to be considered as an exemplification of the principles of this invention and is not intended to limit the invention to the embodiments illustrated.

A copper dithiocarbamate salt compound added to a rubber composition to be vulcanized with sulfur increases the heat resistance of the vulcanized rubber composition. The heat resistant rubber composition includes hydrogenated acrylonitrile-butadiene rubber (HNBR), the copper dithiocarbamate salt compound and sulfur. Preferably, the heat resistant rubber composition includes, based on 100 weight (wt.) parts of HNBR, about 0.1 to about 3 wt. parts of the copper dithiocarbamate salt compound and about 0.2 to about 5 wt. parts of the sulfur.

The percentage of butadiene saturation in the HNBR is at least about 80, preferably at least about 90, mole percent (%). If the butadiene saturation is less than about 80 mole % the rubber exhibits a great decrease in heat and ozone resistance.

The acrylonitrile-butadiene copolymer from which the HNBR is made preferably contains acrylonitrile in an amount in the range of about 20 to about 45 wt. % based upon the weight of the acrylonitrile and the butadiene. Oil resistance and cold resistance are improved by using acrylonitrile in an amount in this range.

The iodine value (number) is a measure of unsaturation and is the amount, in milligrams (rag), of iodine absorbed by 100 mg HNBR. To increase the heat resistance, the iodine value is preferably in the range of about 5 to about 35 mg.

The chemical formula for the copper dithiocarbamate salt compound is:

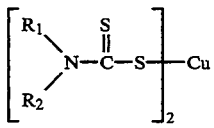

wherein $R_1$ and $R_2$ can be alike or different and represent alkyl groups having one to about six carbon atoms, phenyl groups and benzyl groups. Representative copper dithiocarbamate salts include copper dimethyl dithiocarbamate, copper diethyl dithiocarbamate, copper dipropyl dithiocarbamate, copper dibutyl dithiocarbamate, copper dipentyl dithiocarbamate, copper dihexyl dithiocarbamate, copper diphenyl dithiocarbamate, copper dibenzyl dithiocarbamate, copper methylpropyl dithiocarbamate, copper ethylphenyl dithiocarbamate and the like.

For every 100 weight parts of HNBR the heat resistant rubber composition preferably includes about 0.1 to about 0.3 wt. parts of the copper dithiocarbamate salt compound. When less than about 0.1 wt. parts is utilized, the desired heat resistance cannot be expected. When more than about 3 wt. parts is utilized, the result is a shorter scorch time that affects belt molding time and blooming. The improved heat resistance due to the copper dithiocarbamate salt compound is not affected by the quantity of sulfur in the rubber composition which permits the rubber composition to contain sulfur in a quantity to maintain satisfactory dynamic characteristics.

The sulfur can be present as elemental sulfur, a sulfur donor that provides sulfur or from a combination of elemental sulfur and the sulfur donor.

Representative sulfur donors include dipentamethylene thiuram, 4,4'Dithio-bis-dimorpholine and the like.

The sulfur (in the form of elemental sulfur or as provided by the donor), based on 100 wt. parts of HNBR, is present in an amount in the range of about 0.2 to about 5 wt. parts.

The belts can include a core wire that is a glass fiber cord or an aramid cord. The representative aramids from which the aramid cords can be produced include para fiber filament threads, e.g., "KEVLAR", "TECHNOLA" and "TWARON", and spun threads of meta fibers, e.g., "NOMEX" and "CORNEX".

FIG. 1 illustrates a toothed belt 1 having a toothed portion 2 that includes a plurality of tooth-shaped rubber pieces extending across the width of the toothed portion 2 and extending therefrom and a back rubber portion 4 in which a core wire 3 is embedded. A sheath of toothed cloth 5 is bonded to the surface of the tooth portion 2. At least one, and preferably both, of the toothed portion and the back rubber portion are made of the heat resistant rubber composition.

The tooth cloth 5 can be a canvas made of either a conventional 6,6 nylon or aramid fibers. Representative aramid fibers include para fiber filament threads, e.g. "KEVLAR", "TECHNOLA" and "TWARON", and spun threads of meta fibers, e.g. "NOMEX" and "CORNEX". The canvas can be conventionally pre-treated prior to bonding to the toothed rubber portion.

Figure 2:
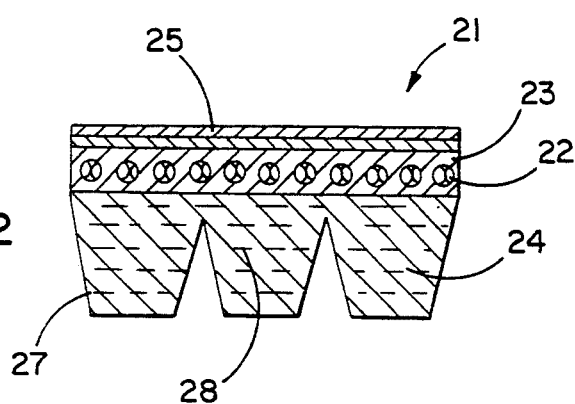
FIG. 2 is a sectional view of a V-ribbed belt taken perpendicular to the direction of travel of the V-ribbed belt.

FIG. 2 illustrates a V-fibbed belt 21 having a bonding rubber layer 23 and a compressed rubber layer 24. Core wires 22 are embedded in the bonding rubber layer 23. The compressed rubber layer 24 has a plurality of rib members 27 extending in the longitudinal direction of the belt 21 and having a truncated triangular cross-section. The surface of the bonding rubber layer 23 has bonded thereon a two-ply canvas 25. At least one, and preferably both, of the bonding rubber layer and the compressed rubber layers are made of the heat resistant rubber composition.

The compressed rubber layer 4 can include short fibers 28 to improve side pressure resistance. When the short fibers 28 protrude from the compressed rubber layer 24 and contact the pulleys (not shown) the friction coefficient of the compressed rubber layer 24 and the noise caused by running the V-fibbed belt 21 are reduced.

Representative short fibers include nylon 6, nylon 66, polyester, cotton and short aramid fibers. Preferably, short aramid fibers, which exhibit good rigidity, strength and wear resistance, are utilized. Representative short aramid fibers are those made from aramids having aromatic rings, e.g., "CORNEX", "NOMEX", "KEVLAR", "TECHNOLA", "TWARON" and the like.

The short fibers preferably have a length in the range of about 1 to about 20 mm.

Preferably, the short fibers are present in an amount in the range of about 1 to about 30 wt. parts per 100 wt. parts of HNBR. When the amount of short fibers is less than about 1 wt. part the rubber composition of the compressed rubber layer undesirably becomes easily tacked and is worn out. When more than about 30 wt. parts of short fibers is utilized, the short fibers are not uniformly distributed in the rubber composition which lowers the strength of the compressed rubber layer.

To improve the bonding of the short fibers with the HNBR, the short fibers are preferably pre-treated with a processing solution that includes epoxy compounds or isocyanate compounds. Representative epoxy compounds include the reaction products between: a polyvalent alcohol, e.g., ethylene glycol, glycerine and pentaerythritol and a halogen containing epoxy compounds, e.g., epichlorohydrin; a polyalkylene glycol, e.g., polyethylene glycol, and a halogen containing epoxy compound; and a polyvalent phenyl compound, e.g., resorcinol, bis(4-hydroxy phenyl)dimethyl methane, phenol-formaldehyde resin and resorcinol-formaldehyde resins, and a halogen containing epoxy compound.

Representative isocyanate compounds include 4,4' diphenyl methane diisocyanate, toluene 2,4-diisocyanate, phenyl diisocyanate and polyaryl polyisocyanate.

The processing solution is made by mixing the epoxy compound or isocyanate compound with an organic solvent, e.g., toluene and methyl ethyl ketone.

The following examples are provided by way of illustration, not by way of limitation.

EXAMPLE 1: TOOTHED BELTS

TABLE I discloses formulations for heat resistant rubber compositions 1 to 5 and for comparative, conventional compositions C1 to C5 from which the tooth and rubber back portions of toothed belts were made.

industrial nylon threads with a thickness of about 0.25 mm. An unvulcanized rubber sheet was placed over the cords. The mold was placed in a curing apparatus that exposed the rubber sheet to vulcanization conditions under a normal steam that included gradually increasing the temperature to 153° C. and maintaining an elevated temperature of 153° C. and an elevated pressure of 2 MPa (about 20 kg/cm$^2$) for a time period of 30 minutes. The rubber is forced into the grooves to form teeth, laminated to the cords and canvas and vulcanized at the elevated temperature and pressure. The toothed belt produced by the press fitting method has a STPD tooth form with a tooth pitch of 8 mm, a tooth length of 792 mm and a tooth width of 19.1 mm. The STPD form is disclosed in U.S. Pat. No. 3,924,481 which is assigned to Goodyear.

Figure 3:
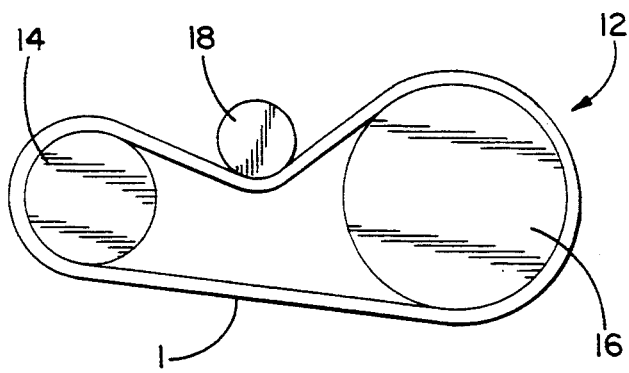
FIG. 3 shows a two-axes running test apparatus for toothed belts.

Testing was performed by stretching the toothed belt on a two-axes running test apparatus 12 (FIG. 3) to measure the running time elapsed prior to the development of a crack on the back rubber portion. The two-axes running test apparatus 12 has a drive pulley 14 (having 21 teeth), a driven pulley 16 (having 42 teeth) and, between the drive pulley 14 and the driven pulley 16, a tension pulley 18 (having a diameter of 55 mm) through which the belt 1 is threaded. The test was run with the apparatus 12 in an atmosphere having a temperature of 120° C., the drive pulley 14 rotating at a speed of 7,200 revolutions per minute (rpm) and a load of 5 pounds per square inch (psi) with the tension pulley 18 providing an initial tension of 150 newtons (N).

TABLE II, below, shows that the life of the toothed belts using the heat resistant rubber compositions 1 to 3

TABLE I

| COMPONENT | TOOTHED BELT RUBBER COMPOSITIONS | | | | | | | | | |
|---|---|---|---|---|---|---|---|---|---|---|
| | C1 | C2 | C3 | C4 | C5 | 1 | 2 | 3 | 4 | 5 |
| HNBR[1] | 100 | 100 | 100 | 100 | 100 | 100 | 100 | 100 | 100 | 100 |
| Stearic acid | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 |
| Antioxidant[2] | 2 | 2 | 2 | 2 | 2 | 2 | 2 | 2 | 2 | 2 |
| Plasticizer[3] | 8 | 8 | 8 | 8 | 8 | 8 | 8 | 8 | 8 | 8 |
| HAF carbon black | 40 | 40 | 40 | 40 | 40 | 40 | 40 | 40 | 40 | 40 |
| Sulfur | 1 | 0.5 | 1 | 1 | 1 | 1 | 1 | 0.5 | 1 | |
| Accelerator (Tetramethyl thiuram disulfide [TMTD]) | 1 | 1.5 | 1 | 1 | 1 | 1 | 1 | 1.5 | 1 | |
| Accelerator (Dibenzothiazyl disulfide [MBTS]) | 0.5 | | | | | | | | | |
| Accelerator (Mercaptobenzothiazole [MBT]) | | 0.5 | | | | | | 0.5 | | |
| Accelerator (Copper dimethyl dithiocarbamate [CuMDC]) | | | | | | 0.5 | | 0.5 | 0.2 | 1.0 |
| Accelerator (Copper dibutyl dithiocarbamate) | | | | | | | 0.5 | | | |
| Accelerator (Zinc dimethyl dithiocarbamate [ZnMDC]) | | | 0.5 | | | | | | | |
| Accelerator (Ferric dimethyl dithiocarbamate [FeMDC]) | | | | 0.5 | | | | | | |
| Accelerator (Tellurium diethyl dithiocarbamate [TeEDC]) | | | | | 0.5 | | | | | |

[1]Zetpol 2020 Hydrogenated nitrile rubber commercially available from Nippon Zeon Co., Ltd.
[2]4,4'(α, α-Dimethylbenzyl)diphenylamine
[3]Dioctyl sebacate The heat resistant rubber compositions and the comparative compositions whose formula are provided in TABLE I were prepared using a Banbury mixture. Sheets of unvulcanized rubber were prepared using a calendar.

The toothed belts were fabricated according to the conventional press fitting method. In this method, an endless canvas loop is placed on a grooved, circular mold and cords are wound spirally on the canvas. The canvas was a 2/2 twill textile having a weft made of 6,6 nylon woolly processed threads and warps made of 6,6 have a longer life as compared to comparative belts that utilize the conventional compositions C1 to C5. All failures were due to cracks developed on the back rubber portion.

TABLE II

| | RUNNING TEST RESULTS | | | | | | | |
|---|---|---|---|---|---|---|---|---|
| | C1 | C2 | C3 | C4 | C5 | 1 | 2 | 3 |
| Belt running | 1250 | 1700 | 1310 | 1110 | 1290 | 2150 | 2080 | 2880 |

TABLE II-continued

| | RUNNING TEST RESULTS | | | | | | | |
|---|---|---|---|---|---|---|---|---|
| | C1 | C2 | C3 | C4 | C5 | 1 | 2 | 3 |
| life (hrs.) | | | | | | | | |

Test samples of each composition were produced by vulcanizing the unvulcanized rubber sheets in a press at a temperature of 153° C., an elevated pressure of 2 MPa and a time period of 30 minutes. The test results of the physical properties, which were measured in accordance with JIS K 6301, of the test samples are provided in TABLE III, below. In TABLE III, and TABLE VI, below, "MSL" represents Mooney scorch (rotor size L) and "Vm" represents minimum viscosity.

EXAMPLE 2: V-RIBBED BELTS

Heat resistant rubber compositions 6 to 8 and conventional, comparative compositions C6 to C10, whose formulations are disclosed in TABLE IV, below, were used to make the compressed rubber layer of V-ribbed belts. The bonding rubber layer was made using the comparative rubber composition C1.

TABLE IV

| | V-RIBBED BELT RUBBER COMPOSITIONS | | | | | | | |
|---|---|---|---|---|---|---|---|---|
| COMPONENT | C6 | C7 | C8 | C9 | C10 | 6 | 7 | 8 |
| HNBR[1] | 100 | 100 | 100 | 100 | 100 | 100 | 100 | 100 |
| Aramid Fiber (Cornex 2dX3 mm) | 15 | | 15 | 15 | 15 | 15 | 15 | 15 |
| Aramid Fiber (Twaron 1.5d X 4 mm) | | 15 | | | | | | |
| Stearic Acid | 1 | 1 | 1 | 1 | 1 | 1 | 1 | 1 |
| Zinc Oxide | 5 | 5 | 5 | 5 | 5 | 5 | 5 | 5 |
| Antioxidant[2] | 2 | 2 | 2 | 2 | 2 | 2 | 2 | 2 |
| Plasticizer[3] | 8 | 8 | 8 | 8 | 8 | 8 | 8 | 8 |
| HAF carbon black | 40 | 40 | 40 | 40 | 40 | 40 | 40 | 40 |
| Sulfur | 1 | 1 | 1 | 1 | 1 | 1 | 1 | 0.5 |
| Accelerator (Tetramethyl thiuram disulfide [TMTD]) | 1 | 1 | 1 | 1 | 1 | 1 | 1 | 1.5 |
| Accelerator (Dibenzothiazyl disulfide [MBTS]) | 0.5 | 0.5 | 0.5 | 0.5 | 0.5 | 0.5 | 0.5 | 0.5 |
| Accelerator (Copper dimethyl dithiocarbamate [CuMDC]) | | | | | | 0.5 | | 0.5 |
| Accelerator (Copper dibutyl dithiocarbamate) | | | | | | | 0.5 | |
| Accelerator (Zinc dimethyl dithiocarbamate [ZnMDC]) | | | | 0.5 | | | | |
| Accelerator (Ferric dimethyl dithiocarbamate [FeMDC]) | | | | | 0.5 | | | |
| Accelerator (Tellurium diethyl dithiocarbamate [TeEDC]) | | | | | | | 0.5 | |

[1]Zetpol 2020 Hydrogenated nitrile rubber commercially available from Nippon Zeon Co., Ltd.
[2]4,4'(α,α-Dimethylbenzyl)diphenylamine
[3]Dioctyl Sebacate The short aramid fibers were pre-treated by immersion in a processing solution that included 90 grams (g) of toluene and 90 g. of PAPI (a polyisocyanate compound commercially available from Kasei-UpJohn, Inc.).

The components of each composition were first kneaded in a Banbury mixture and then rolled by a

TABLE III

| | PHYSICAL PROPERTY TEST RESULTS | | | | | | | | | |
|---|---|---|---|---|---|---|---|---|---|---|
| PHYSICAL PROPERTY | C1 | C2 | C3 | C4 | C5 | 1 | 2 | 3 | 4 | 5 |
| MSL t5 | 17 | 22 | 9.5 | 10 | 14 | 12 | 13 | 15 | 15 | 10 |
| 125° C. | 44 | 41 | 42 | 44 | 43 | 43 | 44 | 41 | 42 | 43 |
| Hardness (JIS A) | 65 | 63 | 65 | 65 | 66 | 67 | 67 | 66 | 66 | 68 |
| 100% Modulus | 2.7 | 2.3 | 3.0 | 3.0 | 3.3 | 3.3 | 3.3 | 2.7 | 3.0 | 3.0 |
| Tensile strength (MPa) | 26.5 | 22.4 | 25.5 | 25.5 | 26.5 | 25.5 | 25.3 | 22.5 | 27.3 | 25.9 |
| Elongation (%) | 488 | 529 | 440 | 430 | 433 | 430 | 455 | 466 | 502 | 462 |
| Heat resistant Hardness (JIS A) after 8 days at 140° C. | 75 | 73 | 75 | 74 | 75 | 75 | 75 | 74 | 74 | 72 |
| 100% Modulus (MPa) | 12.0 | 8.1 | 12.1 | 12.3 | 12.5 | 9.4 | 9.5 | 7.4 | 9.6 | 7.2 |
| Tensile strength (MPa) | 19.2 | 19.6 | 20.1 | 19.7 | 20.6 | 20.6 | 20.7 | 20.6 | 20.3 | 19.7 |
| Elongation (%) | 158 | 195 | 166 | 140 | 168 | 241 | 238 | 301 | 2255 | 294 |

The test results of TABLE III show that the heat resistant rubber compositions have superior heat resistance as compared to the conventional, comparative compositions.

The addition to the HNBR of a copper dithiocarbamate salt compound as a vulcanizing accelerator improves the heat resistance of the HNBR. The use of these rubber compositions in the toothed belt extended the belt life in a high temperature environment.

calendar to form a sheet of unvulcanized rubber. The compressed rubber sheet contained the short fibers orientated in the width direction of the belt. The V-ribbed belts had core wires that are ropes of polyester fibers embedded in the bonding rubber layer. A cotton canvas and the compressed rubber layer sandwich the bonding rubber layer. The configuration of the V-ribbed belt was a Type K 3-ribbed belt according to the RMA Standard and has a length of 1,100 mm, a rib pitch of 3.56 mm, a rib height of 2.9 mm, a belt thickness of 5.3 mm and a rib angle of 40°. Vulcanization was performed under normal vulcanization conditions under a normal steam that included gradually increasing the temperature to 153° C. and maintaining an elevated temperature of 153° C. and an elevated pressure of 2 MPa for a time period of 30 minutes.

Figure 4:
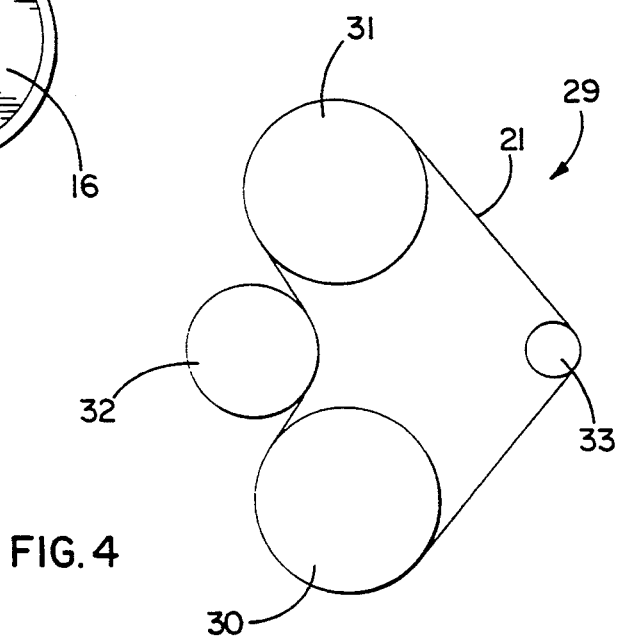
FIG. 4 shows a three-axes running test apparatus for V-ribbed belts.

FIG. 4 shows a three-axes running test apparatus 29 for the testing of the V-ribbed belt 21. The V-ribbed belt 21 is stretched around the drive pulley 30, having a diameter of 120 mm, driven pulley 31 (having a diameter of 120 mm), idler pulley 32 (having a diameter of 85 mm) and tension pulley 33 (having a diameter of 45 mm). The test was run with the apparatus 29 in an atmosphere having a temperature of 120° C. The drive pulley 30 was rotated at 4,900 rpm with the load on the driven pulley 31 being 12 psi and the tension pulley 33 being subjected to an initial tension of 58.6N. The idler pulley 32 was engaged with the back surface of the V-fibbed belt 21 with an angle of contact of approximately 120°. The running time elapsed prior to development of a crack on the rib member of the belt was measured. The running test results are provided in TABLE V.

TABLE V

COMPARATIVE V-RIBBED BELT RUNNING TEST RESULTS

|  | COMPARATIVE | | | | | EMBODIMENT | | |
|---|---|---|---|---|---|---|---|---|
|  | C6 | C7 | C8 | C9 | C10 | 6 | 7 | 8 |
| Belt Running Life (hrs.) | 195 | 205 | 178 | 188 | 191 | 330 | 315 | 428 |

Test samples of each composition were produced by vulcanizing the unvulcanized rubber sheets in a press at a temperature of 153° C., an elevated pressure of 2 MPa and a time period of 30 minutes. The test results of the physical properties, which were measured in accordance with JIS K 6301, of the test samples are provided in TABLE VI.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A belt including a rubber composition comprising:
   a rubber consisting essentially of hydrogenated acrylonitrile-butadiene rubber having a percentage of butadiene saturation of not less than about 80 mole percent;
   a copper dithiocarbamate salt compound; and
   sulfur.

2. The belt in accordance with claim 1 wherein the belt is selected from the group of toothed belts and V-ribbed belts.

3. A toothed belt capable of being used with a motor, the toothed belt comprising:
   a toothed portion; and
   a back portion, at least one of the toothed and back portions being made from a heat resistant rubber composition comprising:
   hydrogenated acrylonitrile-butadiene rubber (HNBR) having a percentage of butadiene saturation of not less than about 80 mole percent (%);
   a copper dithiocarbamate salt compound; and
   sulfur.

4. The toothed belt in accordance with claim 3 wherein for every 100 weight (wt.) parts of HNBR, the rubber composition contains the copper dithiocarbamate salt compound in an amount in the range of about 0.1 to about 3 wt. parts.

5. The toothed belt in accordance with claim 3 wherein the formula of the copper dithiocarbamate salt compound is:

TABLE VI

| PHYSICAL PROPERTY | PHYSICAL PROPERTY TEST RESULTS | | | | | | | |
|---|---|---|---|---|---|---|---|---|
|  | COMPARATIVE | | | | | EMBODIMENT | | |
|  | C6 | C7 | C8 | C9 | C10 | 6 | 7 | 8 |
| MSL t5 | 17 | 22 | 9.5 | 10 | 14 | 12 | 13 | 15 |
| 125° C. Vm | 33 | 42 | 31 | 35 | 34 | 32 | 33 | 31 |
| Hardness (JIS A) same direction as orientation of cut fiber | 75 | 76 | 75 | 75 | 76 | 77 | 77 | 76 |
| Tensile strength (MPa) | 14.8 | 15.7 | 14.5 | 15.0 | 15.2 | 15.3 | 16.2 | 15.5 |
| Elongation (%) | 48 | 40 | 35 | 35 | 40 | 44 | 38 | 44 |
| Perpendicular direction 100% Modulus (MPa) | 4.3 | 3.8 | 4.7 | 4.6 | 4.9 | 4.8 | 4.9 | 4.3 |
| Tensile strength (MPa) | 13.3 | 13.9 | 13.8 | 14.1 | 13.5 | 14.4 | 14.1 | 13.9 |
| Elongation (%) | 465 | 444 | 420 | 418 | 425 | 415 | 430 | 440 |
| Heat resistant hardness (JIS A) after 8 days at 140° C. | 85 | 84 | 85 | 84 | 85 | 85 | 85 | 84 |
| Perpendicular direction 100% Modulus (MPa) | 15.7 | 13.9 | 15.6 | 15.3 | 15.8 | 10.5 | 10.7 | 9.0 |
| Tensile strength (MPa) | 17.6 | 15.9 | 17.5 | 16.0 | 17.2 | 18.0 | 17.5 | 17.1 |
| Elongation (%) | 123 | 119 | 125 | 130 | 120 | 218 | 216 | 290 |

The V-ribbed belt made from the heat resistant rubber composition has a longer life as compared to a V-ribbed belt made of a conventional composition.

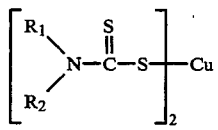

wherein R1 and R2 are alike or different and are selected from the group of alkyl groups having 1 to about 6 carbon atoms, phenyl groups and benzyl groups.

6. The toothed belt in accordance with claim 3 wherein for every 100 weight (wt.) parts of HNBR, the rubber composition contains the sulfur in an amount in the range of about 0.2 to about 5 wt. parts.

7. A V-ribbed belt capable of being used with a motor, the V-ribbed belt comprising:
   a bonding rubber layer; and
   a compressed rubber layer including at least two rib members in the longitudinal direction of the belt, at least one of the bonding and compressed rubber layers being made from a heat resistant rubber composition comprising:
   hydrogenated acrylonitrile-butadiene rubber (HNBR) having a percentage of butadiene saturation of not less than about 80 mole percent (%);
   a copper dithiocarbamate salt compound; and
   sulfur.

8. The V-ribbed belt in accordance with claim 7 wherein for every 100 weight (wt.) parts of HNBR, the rubber composition contains the copper dithiocarbamate salt compound in an amount in the range of about 0.1 to about 3 wt. parts.

9. The V-ribbed belt in accordance with claim 7 wherein the formula of the copper dithiocarbamate salt compound is:

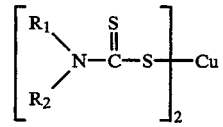

wherein R1 and R2 are alike or different and are selected from the group of alkyl groups having 1 to about 6 carbon atoms, phenyl groups and benzyl groups.

10. The V-ribbed belt in accordance with claim 7 wherein for every 100 weight (wt.) parts of HNBR, the rubber composition contains the sulfur in an amount in the range of about 0.2 to about 5 wt. parts.

11. The V-ribbed belt in accordance with claim 7 wherein the rubber composition further comprising short fibers.

12. The V-ribbed belt in accordance with claim 11 wherein for every 100 weight (wt.) parts of HNBR, the rubber composition contains the short fibers in an amount in the range of about 1 to about 30 wt. parts.

* * * * *